No. 631,219. Patented Aug. 15, 1899.
B. LJUNGSTRÖM.
PATH FOR DRIVING CHAINS FOR VELOCIPEDES, &c.
(Application filed June 25, 1895.)
(No Model.) 2 Sheets—Sheet 1.

WITNESSES:
E. B. Bolton
E. A. Scott

INVENTOR
Birger Ljungström
BY 
ATTORNEYS

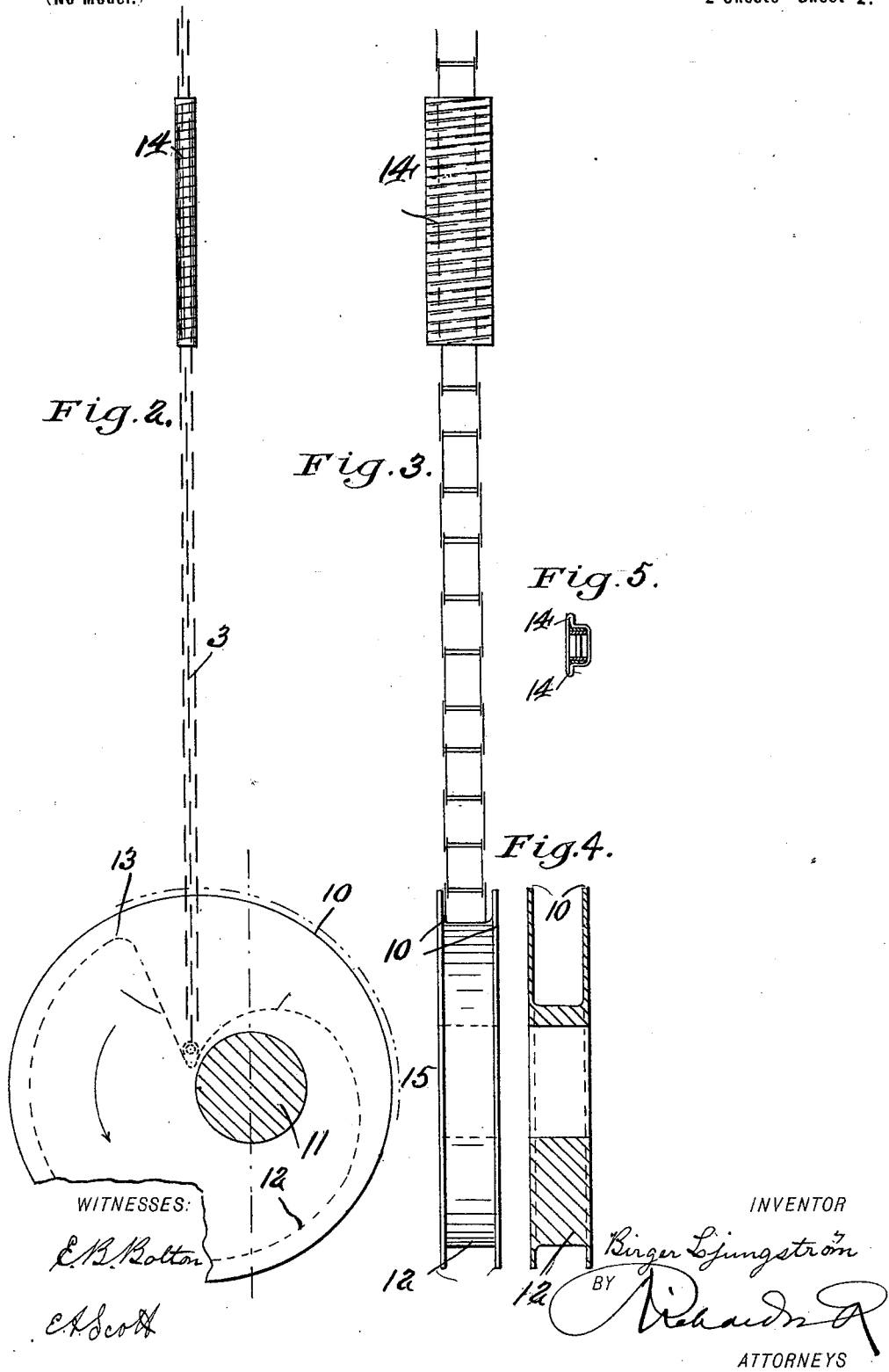

UNITED STATES PATENT OFFICE.

BIRGER LJUNGSTRÖM, OF STOCKHOLM, SWEDEN.

PATH FOR DRIVING-CHAINS FOR VELOCIPEDES, &c.

SPECIFICATION forming part of Letters Patent No. 631,219, dated August 15, 1899.

Application filed June 25, 1895. Serial No. 554,000. (No model.)

*To all whom it may concern:*

Be it known that I, BIRGER LJUNGSTRÖM, mechanician, a subject of the King of Sweden and Norway, and a resident of 44$^b$ Grefgatan, Stockholm, in the Kingdom of Sweden, have invented certain new and useful Improvements in Paths for Driving-Chains for Velocipedes and other Vehicles, of which the following is a specification, reference being had therein to the accompanying drawings.

This invention relates to a cam wheel or pulley for the drive-chain or drive-rope of velocipedes provided with oscillating treadles, said wheel or pulley being so constructed that the chain or rope acts on its shaft with the greatest radius when the treadle, which is connected with the chain, occupies its middle position, although the said wheel or pulley makes more than one revolution as the treadle moves from one extreme position to the other. The advantage is thereby gained that the pulley need not be made of such large diameter as would otherwise be the case, and an increased velocity ratio is thus obtained, though the winding on and off of the chain always takes place in the same plane.

Figure 1:
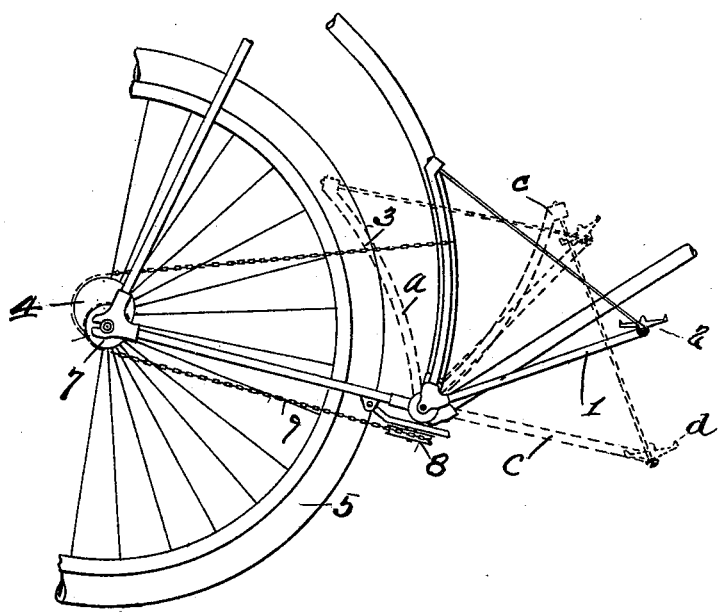
Figure 6:
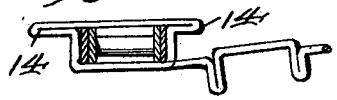

Figure 1 in the accompanying drawings shows a portion of the bicycle viewed from one side; Fig. 2, the pulley and chain viewed from one side; Fig. 3, the same parts viewed from above; Fig. 4, a horizontal section of the pulley; Fig. 5, a transverse section of the chain, and Fig. 6 a detail of the latter.

On each side of the bicycle is a triangular treadle 1, with a pedal 2 and chain 3, the latter passing to a chain-pulley 4, which by means of a coupling in known manner pulls the driving-wheel 5 along when the treadle is depressed, but runs slack during the upward motion of the treadle. Other pulleys 7, on which are wound the ends of a chain or rope 9, passing around the pulley 8, cause one treadle in known manner while descending to pull up the opposite treadle. The pulley 4, which forms the object of the present invention, is provided with high projecting edges or flanges 10 and is located eccentrically on the shaft 11 with reference to the circumference of said flanges or edges, while between the latter the pulley, or, which amounts to the same thing, the bottom 12 of the groove formed by the flanges, has the spiral shape shown by a dotted line in Fig. 2. The chain 3 is secured to the bottom 12 at the part of it nearest to the shaft and can be wound onto said bottom up to the point 13, situated farthest away from the shaft. The succeeding portion of the chain is provided with lateral projections 14, serving to allow of the chain resting on the flanges 10 while it continues to wind on about to the point 15, situated nearest to the shaft, said point being located on the aforesaid flanges. The lateral projections 14 can be produced in various ways—for instance, in order not to interfere with the flexibility of the chain, by winding around it an iron wire bent in the shape shown in Fig. 6. The arrow indicates the direction of winding on. When the chain is wound on clear to the point 15, Fig. 2, the treadle is fully elevated, which corresponds to the position $a$ of Fig. 1. When the treadle is depressed, the chain is unwound. When the chain has unwound to the point 13, it will be farthest removed from the shaft. The treadle now occupies its middle position $b$, Fig. 1. When the treadle is fully depressed, (position $c$,) the chain is wound off, as shown in Fig. 2, being now again close to the shaft. The pulley has now made about one revolution and a half. Thus it may be seen that the desired result is gained by the shape of the bottom 12, the presence of the flanges 10, and the projections 14 of the chain, all in combination with each other. Were the bottom 12 alone used, the pulley would not be able to revolve more than about one revolution, and the pulley consequently would have to be made correspondingly larger if the angle of motion of the treadle were to be retained unaltered. An improved driving-gear is accordingly produced by the device described.

Having now described my invention, what I claim as new, and desire to secure by Letters Patent, is—

In combination in a bicycle, the oscillating treadle, the ratchet disk or roller on the drive-wheel, said disk having a groove and borders or bearing edges about the same, the reciprocating drive-chain having projections, said projections being arranged in such a position on the chain that they come to rest upon said borders to carry the chain after it has been wound about a turn around the roller or disk the said groove being of cam form with high and low parts and the chain being attached at the low part near the axle.

In witness whereof I have hereunto signed my name in the presence of two subscribing witnesses.

BIRGER LJUNGSTRÖM.

Witnesses:
ERNST SVANQVIST,
A. F. LUNDBORG.